J. NEWMANN.
SHAFT COUPLING.
APPLICATION FILED APR. 15, 1909.
934,622.
Patented Sept. 21, 1909.
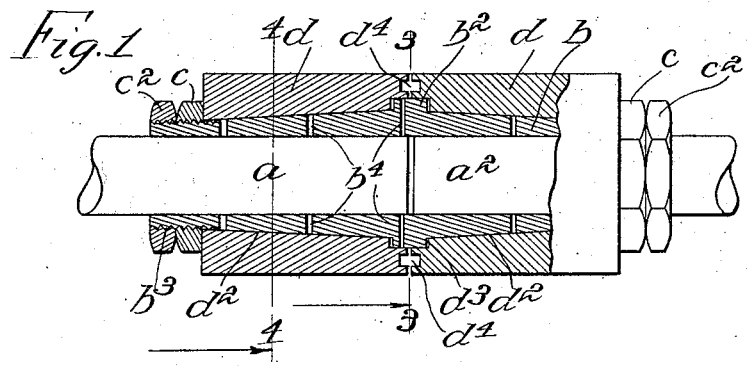
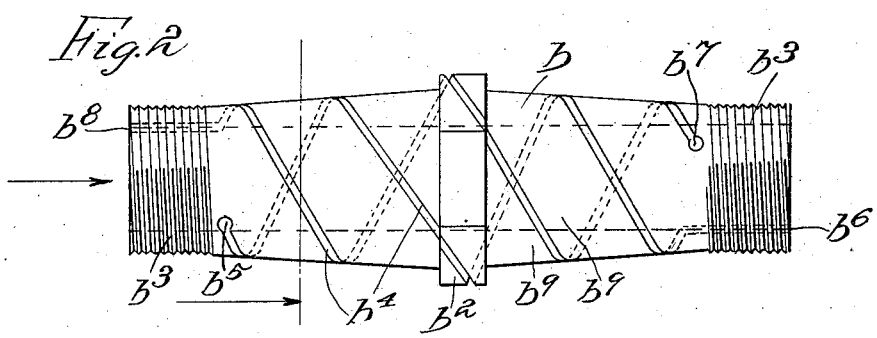
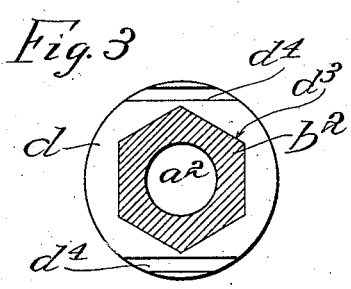
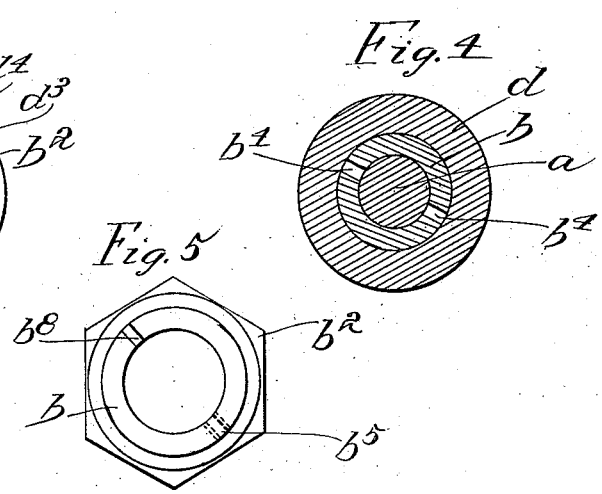
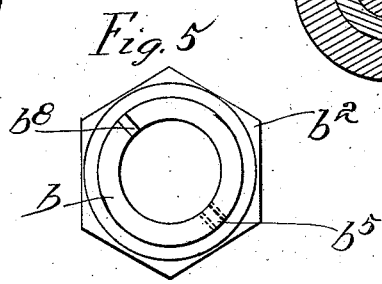
WITNESSES:
H. P. Canfield
C. E. Mulveany
INVENTOR
John Newmann
BY Edgar Tate & Co.
ATTORNEYS

UNITED STATES PATENT OFFICE.

JOHN NEWMANN, OF BROOKLYN, NEW YORK.

SHAFT-COUPLING.

934,622.

Specification of Letters Patent.

Patented Sept. 21, 1909.

Application filed April 15, 1909. Serial No. 490,012.

*To all whom it may concern:*

Be it known that I, JOHN NEWMANN, a citizen of the United States, and residing at Brooklyn, in the county of Kings and State of New York, have invented certain new and useful Improvements in Shaft-Couplings, of which the following is a specification, such as will enable those skilled in the art to which it appertains to make and use the same.

This invention relates to means for coupling shafts of various kinds and classes, such as counter shafts, line shafts, machine shafts and various other kinds or classes of rotary and other source; and the object thereof is to provide an improved coupling of this class designed for use in connecting shafts end to end, and which may be conveniently applied whenever desired and as easily removed for repairing or other purposes.

The invention is fully disclosed in the following specification, of which the accompanying drawing forms a part, in which the separate parts of my improvement are designated by suitable reference characters in each of the views, and in which;—

Figure 1 is a sectional side view of my improved shaft coupling and showing the same in operation, Fig. 2 a side view of the main sleeve or rib of my improved coupling, Fig. 3 a transverse section on the line 3—3 of Fig. 1, Fig. 4 a transverse section on the line 4—4 of Fig. 1, and;—Fig. 5 an end view of the sleeve shown in Fig. 2.

In the drawing forming part of this specification, I have shown at $a$ and $a^2$ two shafts to be coupled end to end, and in the practice of my invention I provide a double conical sleeve $b$, the central portion of which is provided with a collar $b^2$ which is hexagonal in shape or of other angular form. The end portions of the sleeve $b$ are cylindrical in form and threaded as shown at $b^3$, and that portion of said sleeve between the threaded ends thereof is provided with spirally arranged slots $b^4$ one of which begins adjacent to the threaded portion at one end of said sleeve as shown at $b^5$ and extends through the opposite threaded end portion as shown at $b^6$, and the other of which begins adjacent to the other threaded end portion as shown at $b^7$ and extends through the opposite threaded end portion as shown at $b^8$. As thus constructed, it will be seen, that the body portion of the sleeve $b$ consists of spirally arranged members $b^9$ which are integrally connected at the ends and which give to said sleeve a more or less elastic quality according to the thickness and character of the material employed in its construction. Each screw threaded end of the sleeve $b$ is provided with a nut $c$ and a set nut $c^2$, and mounted on the body portion of said sleeve are two supplemental sleeves $d$.

It will be observed that the opposite end or side portions of the sleeve $b$ are tapered outwardly from the center thereof, and the supplemental sleeves $d$ are correspondingly bored, the inner walls $d^2$ thereof being correspondingly tapered so that the central bores in the adjacent ends thereof are larger than at the outer ends thereof, and said supplemental sleeves are so formed as to snugly fit the end portions of the main sleeve $b$. The adjacent end portions of the supplemental sleeves $b$ are provided with hexagonal or other annular grooves $d^3$ which correspond with and are adapted to receive the collar or rib $b^2$ of the sleeve $b$, and the adjacent end portions of the supplemental sleeves $d$ are also provided in the faces thereof and at the opposite sides thereof with transverse recesses $d^4$.

In coupling the shafts $a$ and $a^2$ the nuts $c$ and $c^2$ are first placed on said shafts, the outer or supplemental sleeves $d$ are then placed on said shafts, after which the inner or main sleeve is placed on one of said shafts and the other is inserted thereinto. The outer or supplemental sleeves $d$ are then moved up onto the conical end portions of the main sleeve $b$ and the nuts $c$ and $c^2$ are screwed into position.

The central bores of the supplemental sleeves $d$ are of such transverse dimensions that said sleeves snugly fit the conical end portions of the main sleeve $b$, and even when the supplemental sleeves are forced fully onto the main sleeve $b$ as shown in Fig. 1, they do not quite come together at $d^5$, and they do not come in contact with the side portions or faces of the rib or collar $b^2$; and in practice the threaded end portions of the main sleeve $b$ are preferably slightly tapered so that the nuts $c$ also serve to contract the said sleeve while forcing the supplemental sleeves $d$ inwardly on the conical end portions of said main sleeve, and this pressure is exerted in compressing the said main sleeve and causing it to securely grasp and hold the shafts $a$ and $a^2$.

Whenever it is desired to uncouple the shafts $a$ and $a^2$, the set nuts $c^2$ are first unscrewed, after which the nuts $c$ are unscrewed and a wedge or wedges are driven transversely through the recesses formed by the grooves $d^4$ in the adjacent end faces of the supplemental sleeves $d$ and this operation forces said sleeves outwardly, and said sleeves may then be detached from the main sleeve $b$, and said main sleeve may be detached from the shafts $a$ and $a^2$, or said shafts withdrawn therefrom.

From the foregoing description, it will be seen, that my improved coupling is a friction coupling, the pressure of the main sleeve $b$ on the shafts $a$ and $a^2$ serving to hold said shafts in connection and to compel one of said shafts to revolve with the other when said coupling is used on a rotary shaft or shafts.

Having fully described my invention, what I claim as new and desire to secure by Letters Patent, is:—

1. The herein described coupling for shafts consisting of a main inner sleeve into which the ends of the shafts are inserted, the end portions of said sleeve being threaded and the body portion thereof between the threaded end portions and the middle thereof being tapered in opposite directions, and said body portion of the sleeve between the threaded end portions thereof being also provided with spirally arranged slots, and supplemental outer sleeves adapted to be inserted onto the end portions of the main sleeve and to closely fit the same, the threaded end portions of the main sleeve being also provided with nuts.

2. The herein described coupling for shafts comprising a main inner sleeve the end portions of which are threaded, said sleeve being also provided centrally thereof with a projecting rib or bead, the body portion of said sleeve between said rib or bead and the screw threaded end portions being tapered, and said body portion between said threaded end portions being provided with spirally arranged slots which begin inwardly of the opposite threaded end portions and extend through the other threaded end portions, and supplemental outer sleeves mounted on the tapered end portions of the main inner sleeve and the bores of which are tapered to correspond therewith, and nuts mounted on the screw threaded end portions of the main inner sleeve.

3. The herein described coupling for shafts comprising a main inner sleeve the end portions of which are threaded, said sleeve being also provided centrally thereof with a projecting rib or bead, the body portion of said sleeve between said rib or bead and the screw threaded end portions being tapered, and said body portion between said threaded end portions being provided with spirally arranged slots which begin inwardly of the opposite threaded end portions and extend through the other threaded end portions, and supplemental outer sleeves mounted on the tapered end portions of the main inner sleeve and the bores of which are tapered to correspond therewith, and nuts mounted on the screw threaded end portions of the main inner sleeve, the inner end faces of the supplemental outer sleeves being also provided adjacent to a side thereof with transverse recesses.

4. The herein described coupling for shafts comprising a main inner sleeve the end portions of which are threaded, said sleeve being also provided centrally thereof with a projecting rib or bead, the body portion of said sleeve between said rib or bead and the screw threaded end portions being tapered, and said body portion between said threaded end portions being provided with spirally arranged slots which begin inwardly of the opposite threaded end portions and extend through the other threaded end portions, and supplemental outer sleeves mounted on the tapered end portions of the main inner sleeve and the bores of which are tapered to correspond therewith, and nuts mounted on the screw threaded end portions of the main inner sleeve, the inner end faces of the supplemental outer sleeves being also provided adjacent to a side thereof with transverse recesses, and said supplemental outer sleeves being also provided in their adjacent faces with annular spaces adapted to receive the central annular bead or projection on the main inner sleeve.

5. The herein described coupling for shafts comprising a main inner sleeve the end portions of which are threaded, said sleeve being also provided centrally thereof with a projecting rib or bead, the body portion of said sleeve between said rib or bead and the screw threaded end portions being tapered, and said body portion between said threaded end portions being provided with spirally arranged slots which begin inwardly of the opposite threaded end portions and extend through the other threaded end portions, and supplemental outer sleeves mounted on the tapered end portions of the main inner sleeve and the bores of which are tapered to correspond therewith, and nuts mounted on the screw threaded end portions of the main inner sleeve, the inner end faces of the supplemental outer sleeves being also provided adjacent to a side thereof with transverse recesses, and said supplemental outer sleeves being also provided in their adjacent faces with annular spaces adapted to receive the central annular bead or projection on the main inner sleeve, said annular bead or projection and said annular recesses being angular in form.

In testimony that I claim the foregoing as my invention I have signed my name in presence of the subscribing witnesses this 13th day of April, 1909.

JOHN NEWMANN.

Witnesses:
H. R. CANFIELD,
C. E. MULREANY.